W. P. McGEOUCH AND G. C. BECKWITH.
APPARATUS FOR FORMING CARTONS OR BOXES.
APPLICATION FILED SEPT. 13, 1917.
1,337,845.
Patented Apr. 20, 1920.
6 SHEETS—SHEET 4.
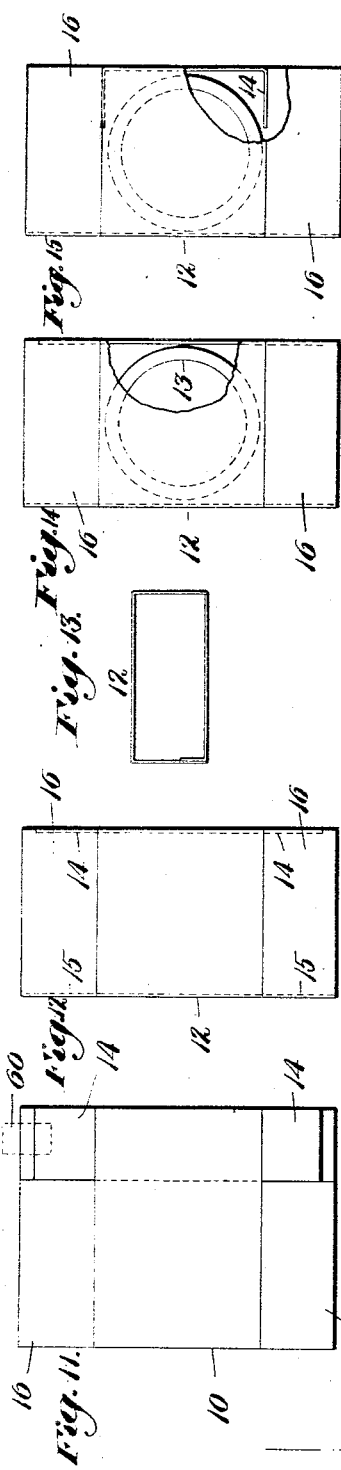
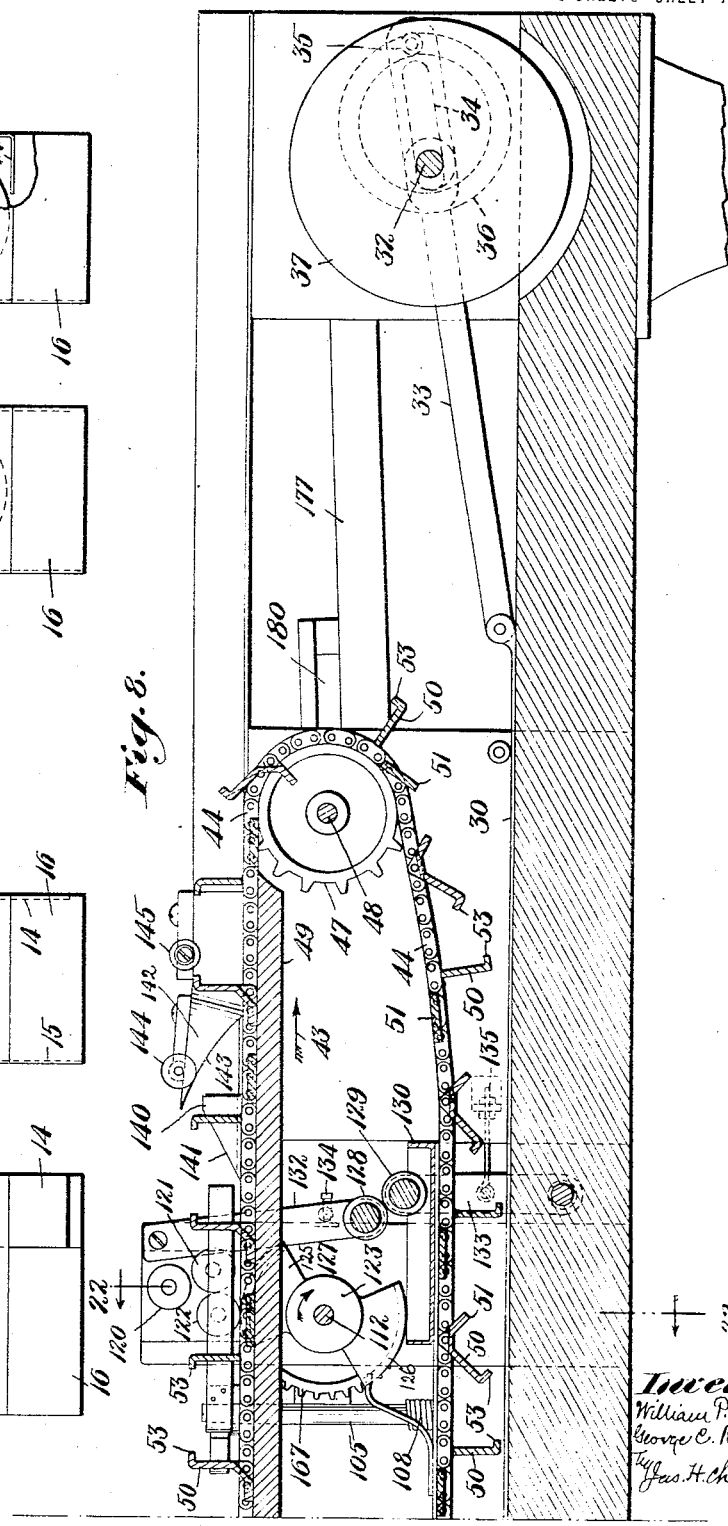

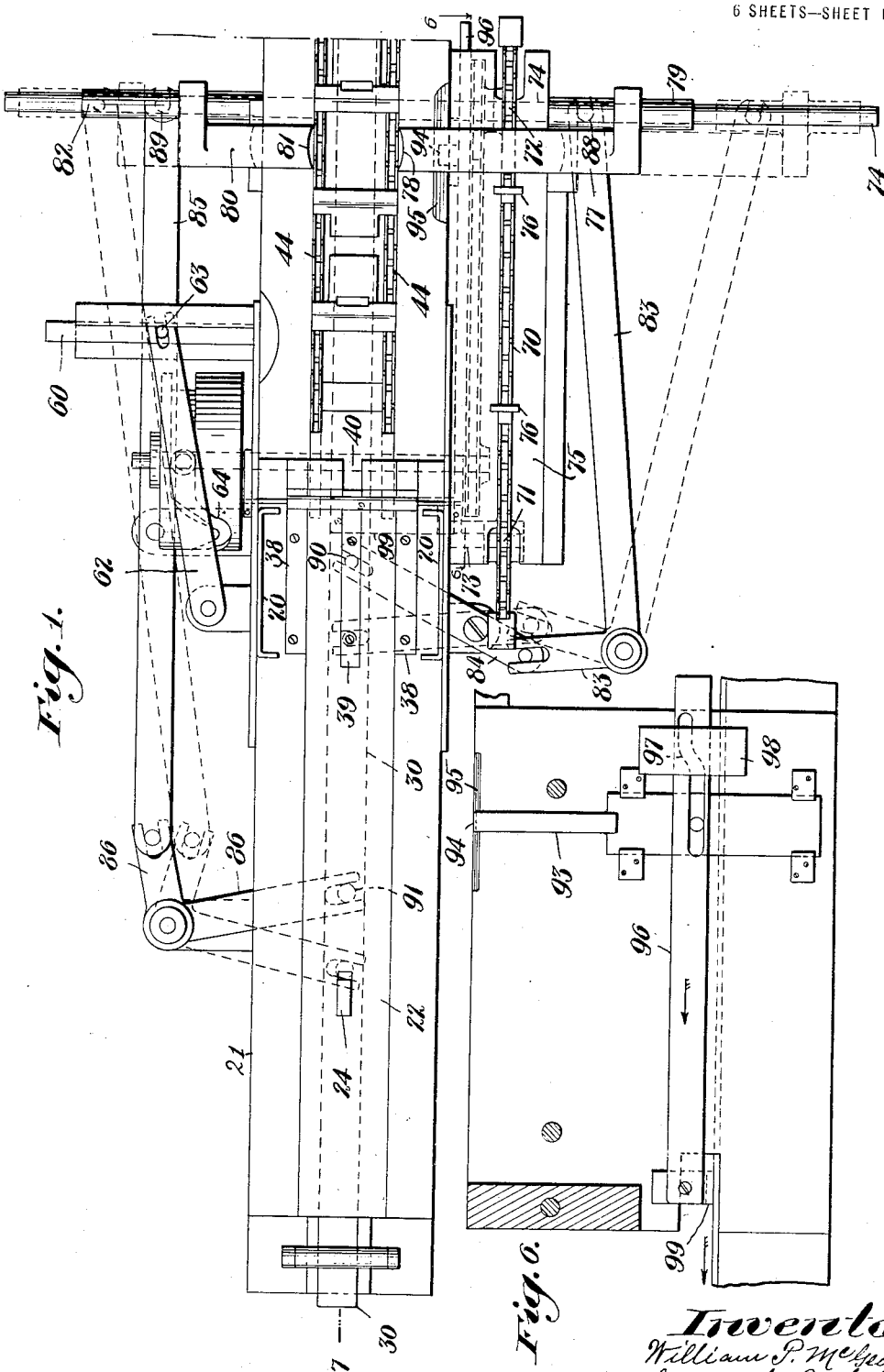

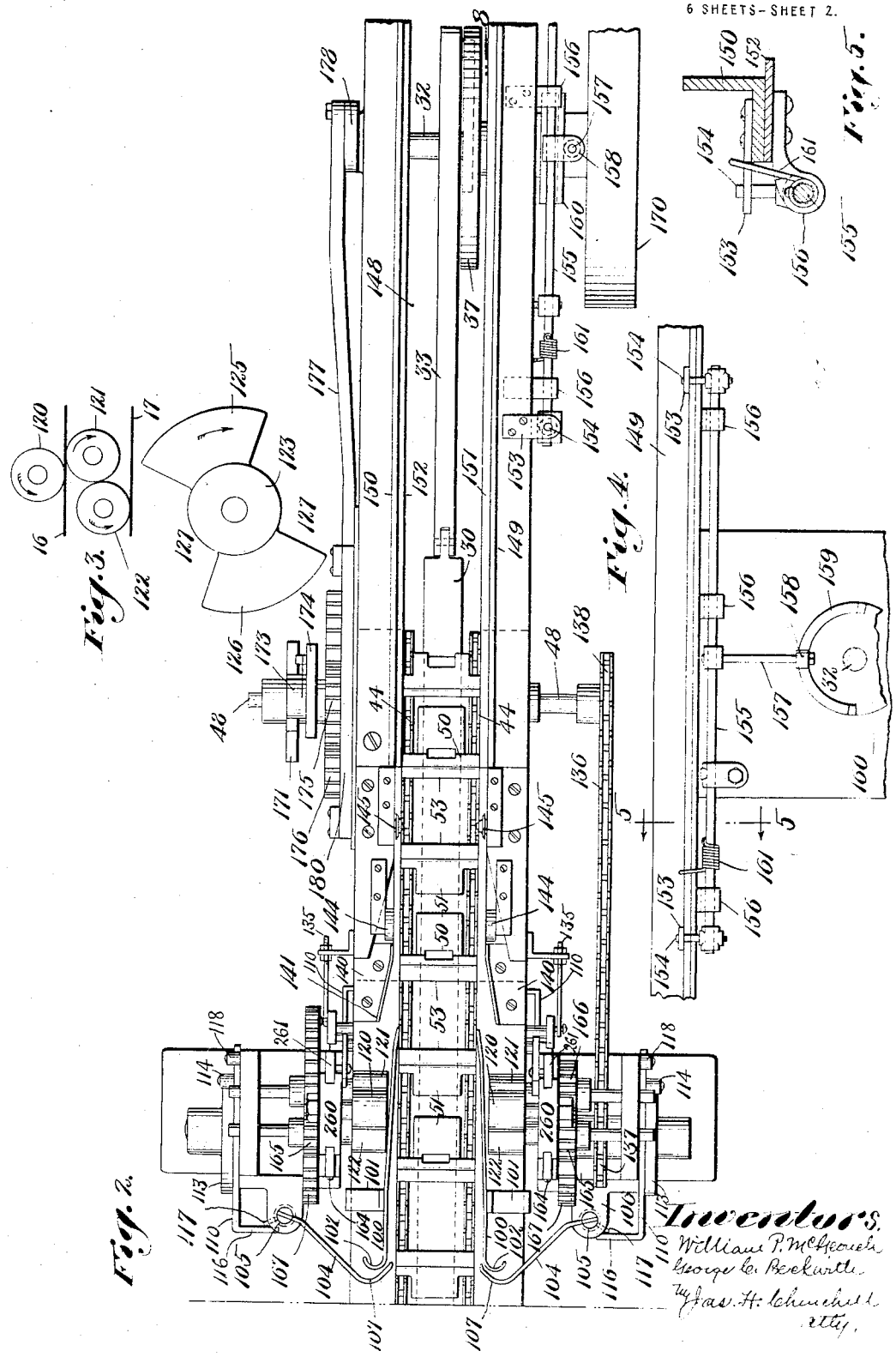

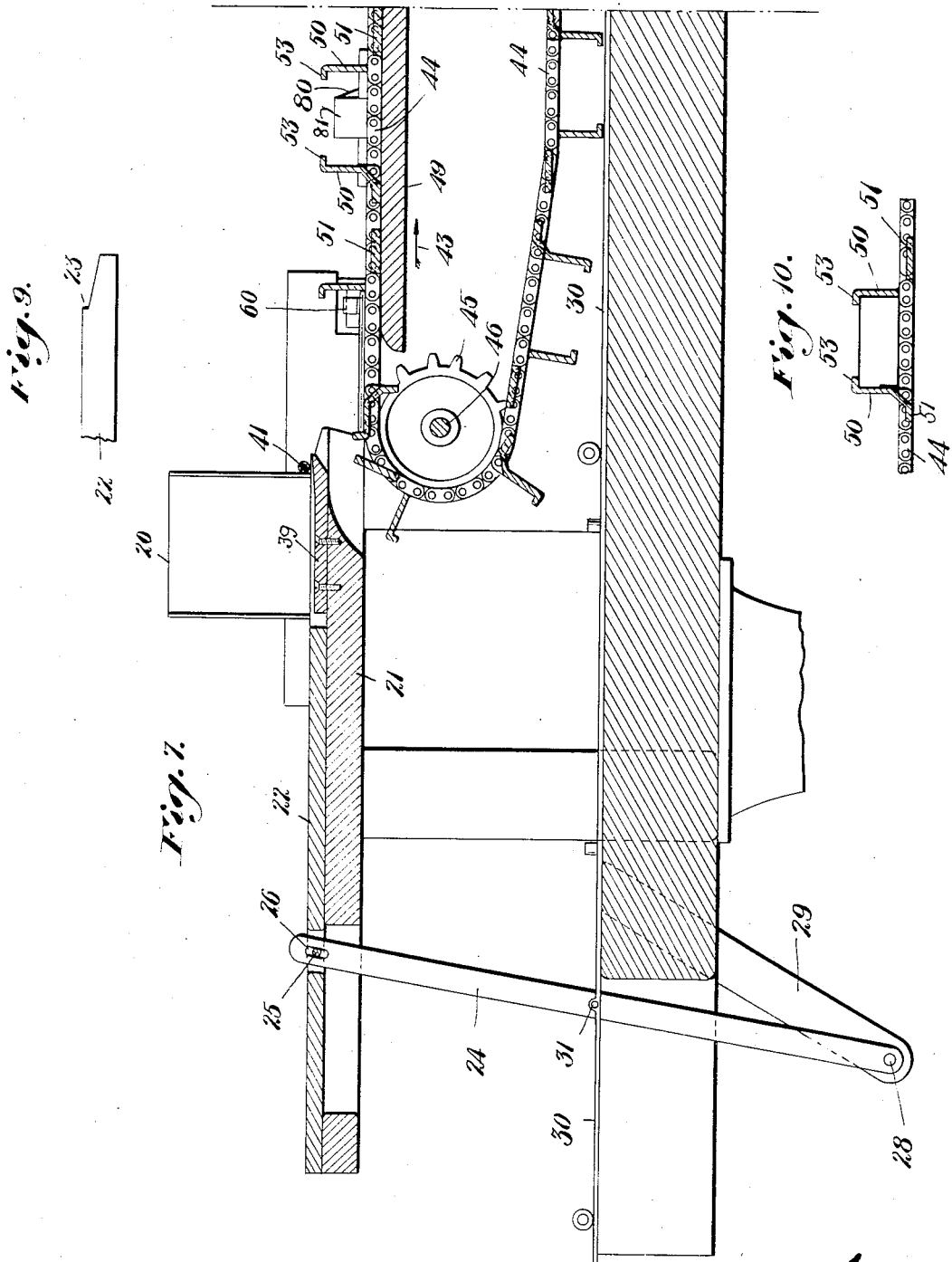

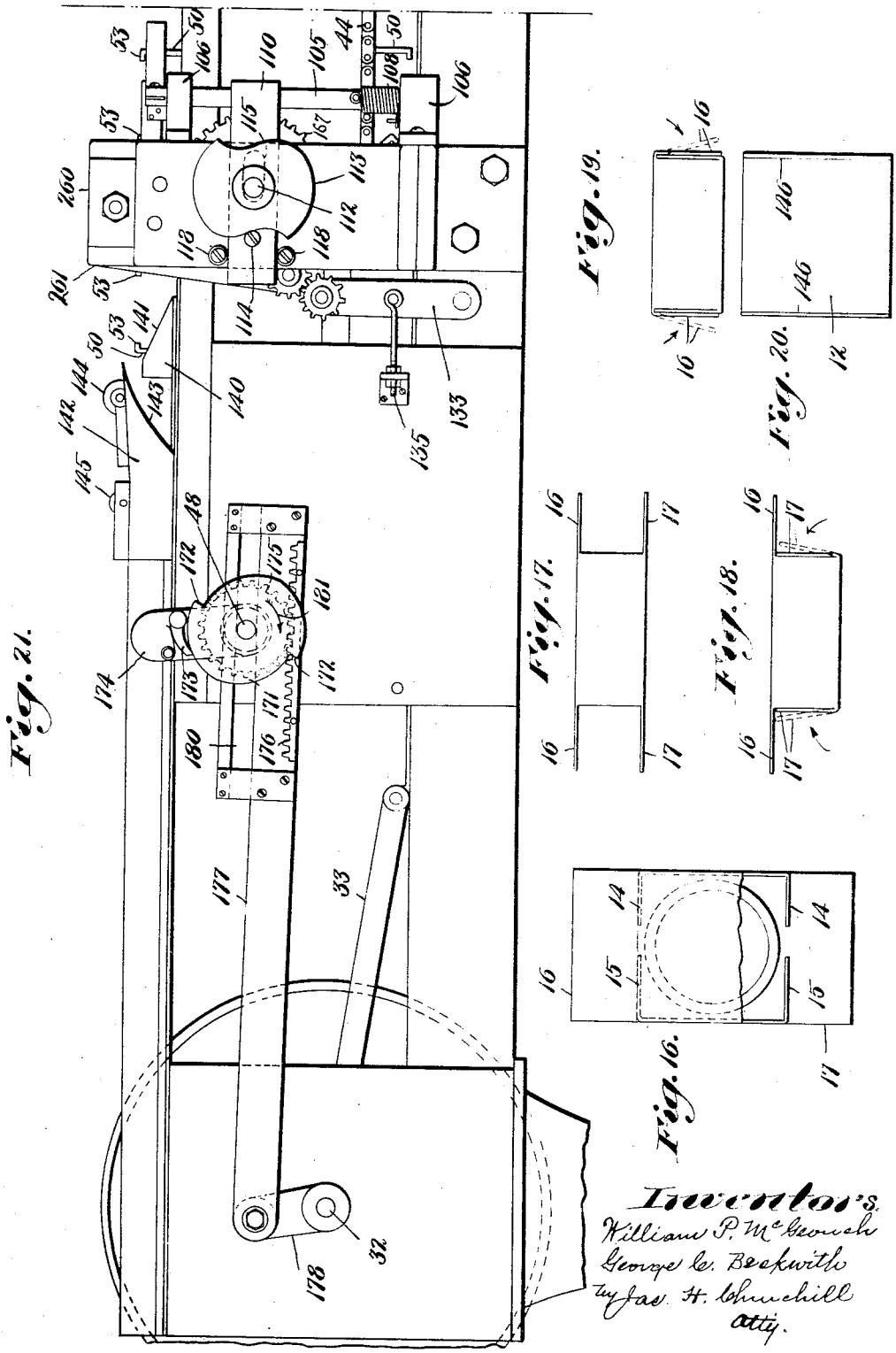

W. P. McGEOUCH AND G. C. BECKWITH.
APPARATUS FOR FORMING CARTONS OR BOXES.
APPLICATION FILED SEPT. 13, 1917.
1,337,845.
Patented Apr. 20, 1920.
6 SHEETS—SHEET 6.
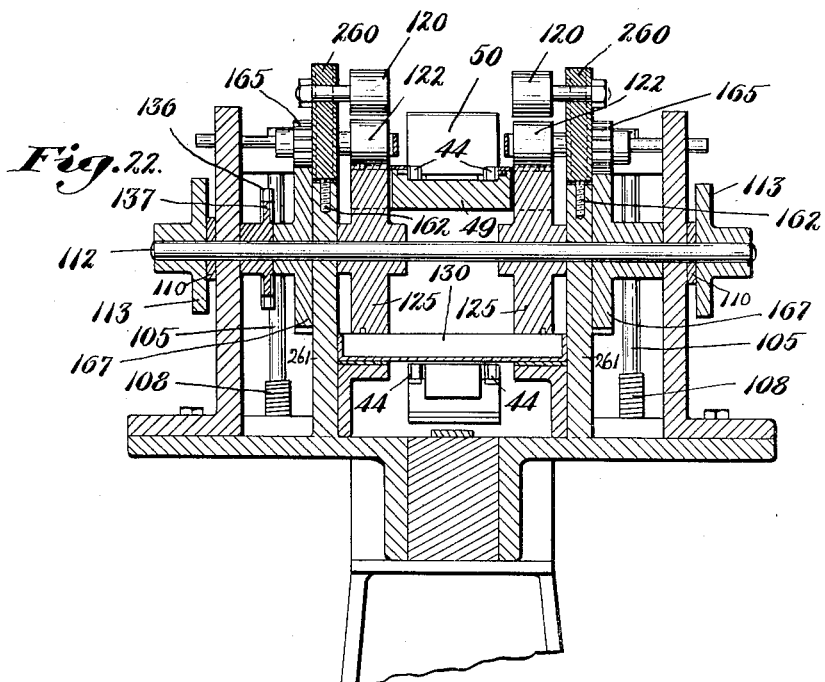
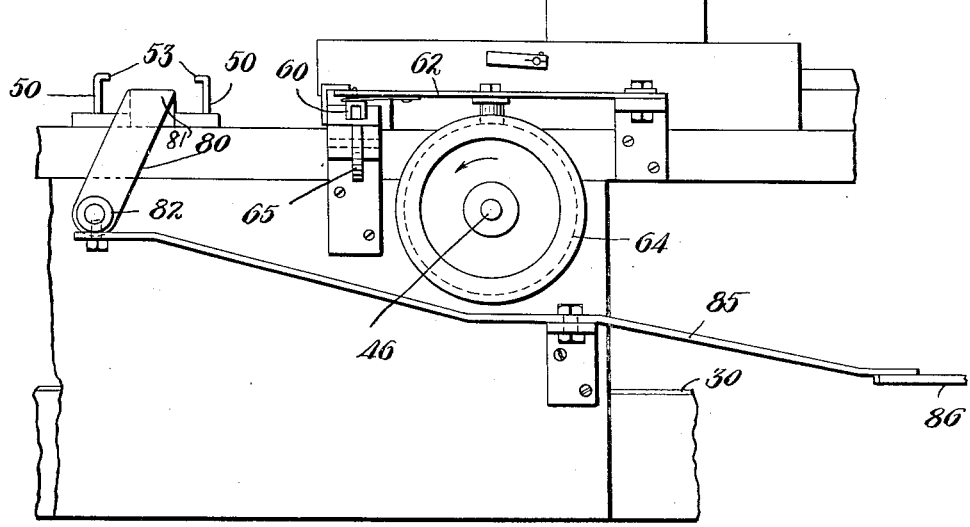
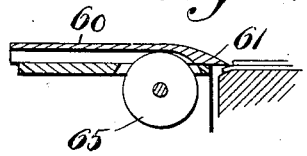
Inventors.
William P. McGeouch
George C. Beckwith
by Jas. H. Churchill
atty.

UNITED STATES PATENT OFFICE.

WILLIAM P. McGEOUCH, OF ARLINGTON, AND GEORGE C. BECKWITH, OF SOMERVILLE, MASSACHUSETTS, ASSIGNORS TO BOSTON WOVEN HOSE & RUBBER CO., OF BOSTON, MASSACHUSETTS, A CORPORATION OF MASSACHUSETTS.

APPARATUS FOR FORMING CARTONS OR BOXES.

1,337,845.            Specification of Letters Patent.      Patented Apr. 20, 1920.

Application filed September 13, 1917. Serial No. 191,133.

*To all whom it may concern:*

Be it known that we, WILLIAM P. MCGEOUCH and GEORGE C. BECKWITH, citizens of the United States, and residents of Arlington and Somerville, respectively, in the county of Middlesex and State of Massachusetts, have invented an Improvement in Apparatus for Forming Cartons or Boxes, of which the following description, in connection with the accompanying drawings, is a specification, like characters on the drawings representing like parts.

This invention relates to apparatus for forming substantially rectangular boxes or cartons from substantially flat blanks, for closing the boxes or cartons, and preferably for automatically inserting the contents of the cartons therein before they are closed.

The invention is especially adapted to be embodied in an apparatus with which boxes or cartons are formed, which are designed to contain articles of rubber or compositions of rubber, such as jar rings, heels for boots and shoes, etc.

The apparatus herein shown as embodying the invention is provided with mechanism for feeding a substantially flat carton blank into position to be opened up and formed into a substantially rectangular box or carton which is open at its opposite ends, and is further provided with mechanism for inserting the jar rings or other article into the box, and with mechanism for holding the end flaps of the box to close the same. The apparatus is also preferably provided with mechanism for applying glue or other adhesive to the end flaps for sealing the box or carton, and with means for pressing the glued end flaps for setting the same.

The apparatus is also preferably provided with mechanism for feeding the jar rings or other articles into position to be inserted into the box.

These and other features of this invention will be pointed out in the claims at the end of this specification.

Figure 1 is a plan view of the left hand portion and

Fig. 2, a plan view of the right hand portion of an apparatus embodying this invention.

Fig. 3, a detail of the gluing mechanism to be referred to,

Fig. 4, a detail of the glue setting mechanism to be referred to.

Fig. 5, a section on the line 5—5, Fig. 4.

Fig. 6, a detail in section on the line 6—6, Fig. 1, of the flap depressing device.

Figs. 7 and 8, enlarged sectional details to be read together, to particularly illustrate the endless carrier and the means for shaping the carton blanks, the section being taken on the lines 7—8, Figs. 1 and 2.

Fig. 9, a detail of the pusher for the carton blank.

Fig. 10, a detail to show the opened-up carton blank between the shaping members.

Figs. 11 to 20, inclusive, diagrammatic views to illustrate the operations of the apparatus.

Fig. 21, a side elevation of the portion of the apparatus shown in Fig. 8.

Fig. 22, an enlarged detail in vertical section on the line 22—22, Fig. 8.

Fig. 23, a detail in side elevation to illustrate the operating cam for the carton blank opener, and Fig. 24, a detail in section of the carton blank opener.

Referring to the drawings, and especially Figs. 11 to 20, 10 represents a carton blank in a substantially flat form, which is opened up and formed into a substantially rectangular carton 12, which is open at its opposite ends as represented in Figs. 12 and 13. The open ended carton 12 has inserted into it the article or articles to be contained therein, which are herein represented as jar rings 13. The jar rings 13 are centered within the body portion of the carton, and the side end flaps 14, 15, are successively folded into their closed or operative position shown in Fig. 16. The top and bottom end flaps 16, 17, are then provided with a coating of adhesive material on the under surface of the top flap and on the upper surface of the bottom flap, after which said flaps are folded into their operative or closed positions indicated in Figs. 18 and 19. The opposite ends of the closed carton or box are preferably subjected to pressure to set the adhesive and seal the box or carton, as will be described, so as to place the closed carton or box with its contents sealed therein and represented in Fig. 20 in condition for immediate shipment.

In the present instance, we have illustrated one construction of apparatus for performing the operations above described and in addition for automatically feeding the jar rings 13 into position for insertion into the carton.

To facilitate description, we will describe in detail the different mechanisms comprising the apparatus herein shown.

The apparatus is provided with a holder or chute for containing a plurality of superimposed carton blanks 10, which holder is shown as composed of two upright members 20, (see Fig. 1) erected upon a table 21 forming part of the framework of the apparatus.

The members of the chute 20 are spaced apart so as to permit of the passage between them of a device for feeding the lowermost carton blank out of the chute or holder 20. The device referred to is herein shown as a reciprocating bar 22 provided at its front end with a shoulder 23 (see Fig. 9) which is of a height substantially equal to the thickness of the flat carton blank 10. The bar 22 is reciprocated on the table 21 as herein shown by a lever 24 having a pin 25 and slot 26 connection with the said bar, (see Fig. 7), and pivoted at 28 to an arm 29 forming part of the framework. The lever 24 is oscillated in a vertical path as herein shown by means of a reciprocating member, shown as a strip or bar 30, to which the lever 24 is pivotally connected at 31 and which is operatively connected with a main or driving shaft 32.

In the present instance the strip or bar 30 has pivotally connected with it one end of a link 33 provided with a slot 34 through which the main shaft 32 extends, and said link has a stud or pin 35 extended into a circular groove 36 in one face of a disk 37 fast on the shaft 32 to rotate therewith, the circular groove 36 having its center eccentric to the shaft 32 (see Fig. 8). The feeding bar 22 for the carton blanks 10 may be guided in its reciprocation by stationary side guide bars 38 and a center bar 39 secured to the table 21 (see Figs. 1 and 7), the center bar 39 being extended into a slot 40 in the front end of the pusher or feeding bar 22 and also serving as a center support for the carton blanks in the chute. The upright chute or holder 20 has coöperating with it a rod 41 located at the front side thereof and under which the lowermost blank is fed by the pusher or feed bar 22. The rod 41 acts as a stop to prevent more than the lowermost carton blank being pushed out of the chute or holder 20 by the shoulder 23 on the bar 22. The flat carton blank 10 is fed out of the chute or holder 20 onto a movable carrier which is intermittently moved in the direction of the arrow 43 in Figs. 7 and 8.

The movable carrier comprises as herein shown parallel link chains 44, which are passed about sprocket wheels 45 on a shaft 46 and about sprocket wheels 47 on a shaft 48 (see Figs. 7 and 8), and between the said shafts is located a stationary platform or table 49 forming part of the frame work and upon which the upper portions of the endless chains 44 are supported so as to travel in a horizontal path. The link chains 44 are spaced apart a distance substantially equal to the length of the carton blank 10, and have interposed between them suitable devices for shaping the blank into the substantially rectangular form shown in Fig. 13. The shaping and forming devices may be made as herein shown and each consists of an angle plate or bar having a member 50, which is designed to assume a substantially vertical position and may be designated the vertical member, and a member 51 which is designed to assume a substantially horizontal position, when said angle plate is in its operative position represented in Figs. 7 and 8, and which may be designated the horizontal member.

The angle plates 50, 51, are arranged on the chains and spaced part so as to operate in pairs, with the tail pieces or horizontal members 51 of each pair of plates extended away from each other, and the vertical members 50 of each pair of plates form the side walls of a die or shaping device by means of which the substantially flat carton blank 10 shown in Fig. 11 is caused to assume a substantially rectangular shape in cross section as shown in Fig. 13. One of the angle plates 50, 51, is pivoted to the link chains 44 and is capable of turning on its pivot except when the chains are passing over the table 49, and when this angle plate 50, 51 is passing over the table 49, it is held in fixed relation to the chains and prevented from turning on its pivot by the horizontal member 51 of said plate engaging the upper surface of the table 49.

The other angle plate 50, 51 of each pair is provided at its opposite ends with link like portions, which form links of the chains 44, and as this angle plate of each pair passes over the table the horizontal member rests on the table and is supported thereby against movement.

The vertical members 50 of the angle plates are made of a height substantially equal to the height of the sides of the box or carton, and said members are provided at their outer ends with flanges or lips 53, which are designed to engage the top surface of the box or carton and thereby assist in squaring the carton blank. By reference to Fig. 7, it will be seen that as the right angle plate of each pair of plates is brought over upon the table 49 by the link chains 44 traveling in the direction of the arrow 43, the link to which said member is attached and the horizontal member 51 thereof engage the upper surface of the table and rests thereon, with the result that the angle plate is rendered substantially rigid in a vertical position, while the left angle plate of said pair which is out of engagement with the table is permitted to turn on its pivot until the member 50 of said plate rests on the link chains and is in a horizontal position. The link chains 44 are arranged with relation to the chute 20 so that as each pair of shaping members 50, 51, pass by the chute, the member 50 of the right angle plate is in its vertical position and the member 50 of the left angle plate is in its horizontal position, and said members are in what may be termed their open position and in condition to receive the flat carton blank 10 ejected from the chute, which blank rests upon the chains between the right angle plate and the flange 53 on the left angle plate as clearly represented in Fig. 7.

When the substantially flat carton blank 10 has been deposited on the movable carrier between a pair of shaping members as represented in Fig. 7, the said blank is given a substantially rectangular shape by the left angle plate being turned, so that the member 50 is brought into a substantially vertical position parallel with the member 50 of the right angle plate, which is accomplished by the tail piece 51 of the left angle plate being brought into engagement with the front end of the table 49, said end being curved or cam-shaped to facilitate the turning movement of the left angle plate.

When the left angle plate is turned as described, the carton blank 10 is bent so that the sides of the blank are confined between the link chains and the inturned flanges 53 of the shaping members 50, as represented in Fig. 10.

It will be understood that the carton blanks are properly made to define the sides from the top and bottom of the box in the manufacture of the carton blanks, and that the top and right side as shown in Fig. 11 constitute the upper layer of the flat blank and the bottom and left side constitute the lower layer of said blank. To facilitate the shaping of the box or carton, it is preferred to provide the machine with a device or tool which may be designated the initial opener, which is preferably made as herein shown (see Figs. 1 and 24) and consists of a knife 60 having a curved or beveled front portion 61 terminating in a substantially thin edge which is designed to pass between the upper and lower layers of the carton blank, and by means of the beveled portion 61 opens up or separates the layers of the carton blank initially so that they may be easily bent or shaped into the substantially rectangular form shown in Fig. 13.

The opening tool or knife 60 also holds down the lower layer of the carton blank, which facilitates the complete opening up of the said blank by the shaping members, but said knife does not interfere with the forward movement of the carrier. The opening tool or knife 60 is reciprocated as herein shown by a lever 62 (see Figs. 1 and 23), which is pivoted at one end and forked at its other end to engage a pin 63 on the knife 60, said lever being oscillated by a cam 64 in a manner well understood, the said cam being properly timed to insert the tool or knife between the layers of the carton blank before the left angle plate of each pair of the shaping device is turned into its vertical position, which may be considered its closed position.

It will also be understood that the movable carrier for the cartons is moved step by step or intermittently and that the opener 60 is started to move toward the carrier while the said carrier is at rest with the flat blank thereon and is properly presented to the said opener to permit the latter to be inserted between the layers of the flat blank at or about the time the carrier begins its next forward movement. The opening tool or knife 60 may and preferably will run on a roller 65 (see Fig. 24) to facilitate movement thereof. After the carton blank has been opened up and given a substantially rectangular form, which condition is represented in Figs. 12 and 13, the end flaps 14, 15, 16, 17, are still in the same planes as the top, bottom and sides of the carton, and the latter is open at its opposite ends.

Provision is made for automatically inserting the contents of the carton therein and also for closing the end flaps and for applying adhesive to the top and bottom flaps.

In the present instance, the articles which are to form the contents of the cartons are represented as jar rings 13 of rubber or compositions of rubber, and provision is made for automatically feeding the jar rings into position to be inserted into the opened up cartons 12. To this end, an endless carrier in the form of a link chain 70 is passed about sprocket wheels 71, 72, mounted upon shafts 73, 74, (see Fig. 1), and arranged with the upper portion of the endless chain running in a slot in a shelf 75 attached to the framework of the machine, the upper surface of the upper portion of said link chain being substantially flush with the upper surface of the shelf 75.

The link chain 70 is provided at intervals with uprights 76, against which are placed a plurality or stack of jar rings 13, usually one dozen, which rest upon the slotted shelf 75 and are carried forward into position to be engaged by a device, which may be termed an inserter and which is herein shown as a bar 77 having at its inner end an upright flange 78, preferably curved to conform to the shape of the jar rings. The bar 77 is attached to a sleeve 79 which slides on the shaft 74, which latter is extended laterally beyond the opposite sides of the machine. The sleeve 79 is reciprocated on the shaft 74, so as to cause the flange 78 on the bar 77 to engage the jar rings and push the stack across the shelf 75 and the top of one side of the framework and into the open carton 12.

A similar device comprising a bar 80 and upright flange 81 may be located on the opposite side of the machine and attached to a sleeve 82, which is mounted on the shaft 74, and the bar 80 and flange 81 are designed to enter the opposite end of the carton and coöperate with the bar 77 and flange 78 to center the stack of jar rings within the carton. The bar 77 may be designated the inserting device, and the bar 80 the centering device, and they are operatively connected with a common actuating device, herein shown as the reciprocating bar 30.

The sleeve 79 is operatively connected with the reciprocating bar 30 by levers 83, 84, and the sleeve 82 by the levers 85, 86, (see Fig. 1). These levers are properly proportioned and arranged to move the inserting and centering devices 77, 80, within the carton the proper distance to center the jar rings therein.

In the present instance, the levers 83, 85, are forked at one end to engage pins 88, 89 on the sleeves 79, 82, and the levers 84, 86, are also forked to engage pins or studs 90, 91, on the reciprocating bar 30.

When the cartons are to be filled with jar rings as in the present instance, it is preferred to provide means for lowering the bottom flap 17 so as to prevent the lowermost jar ring from catching or striking against the front edge of the said flap when pushed into the carton, and also to arch the said flap so as to raise the bottom jar ring into the path of the inserter and avoid liability of the inserter passing over the said ring.

In the present instance, we have shown one construction of device for accomplishing this result, said device (see Figs. 1 and 6), consisting of a vertically reciprocating bar 93 arranged at one side of the machine and provided at its upper end with a finger 94, which is designed to be raised above the upper surface of the side frame of the machine a sufficient distance to permit the bottom flap 17 to pass under it and after the bottom flap has been passed under the finger 94 and the carton properly presented to the inserter 77, the finger is lowered so as to bend the outer edge of the bottom flap 17 below the bottom surface of the lowermost jar ring, which is permitted by a recess 95 in the upper surface of the framework of the machine, and the bottom wall of said recess is preferably suitably shaped so as to arch the bottom flap transversely and thereby raise the lowermost jar ring up above the bottom surface of the inserter, for the purpose above recited. To avoid the lowering member or finger 94 when in its raised position, interfering with the forward movement of the opened up carton into position opposite the inserter 77, the side flap 14 is made shorter than the bottom flap 17 as illustrated in Fig. 11.

The flap lowering member 94 may be raised and lowered as herein shown by a bar 96 provided with a cam slot 27 (see Fig. 6), and said bar is movable in a guide 98 and has one end attached by a cross bar 99 to the reciprocating bar 30 as shown by dotted lines in Fig. 1.

After the jar rings have been inserted into the carton, the latter is moved forward a step so as to effect the folding or closing of the side flaps 14, 15, at each end of the carton.

To this end, the machine is provided on opposite sides of the path of movement of the carton carrier with folding devices for the front side flaps 14, which devices are shown as metal strips 100 secured to brackets 101 and preferably provided at their front ends with curved portions 102 for engagement with the flaps 14. The metal strips 100 are preferably shaped so that their rear ends converge toward the path of movement of the carton carrier and are made long enough to impart a spring action to the rear ends of said strips, which cause the side flaps to be subjected to pressure as they pass by the rear ends of the stationary folders.

The rear side flaps 15 are folded by movable devices, herein shown as cranks or arms 104 attached to upright rock-shafts 105 mounted to turn in suitable bearings 106 attached to the framework of the machine (see Figs. 2 and 21). The rock-shafts 105 are rotated in one direction to move the cranks or arms 104 toward the path of movement of the carton carrier, so as to cause the curved or bent free ends 107 of said arms to engage the rear side flaps 15 and fold them into their closed position shown in Fig. 16. This movement of the rock-shafts may be effected by springs 108 encircling the rock-shafts and having one end fastened to the rock-shafts and the other to the bearings 106.

The rock-shafts 105 are moved in the opposite direction to withdraw the cranks or arms 104 from the path of movement of the rear side flaps 15, when the latter are in their unfolded position represented in Figs. 12, 14 and 15, which is accomplished as herein shown by bars 110, mounted to slide on a shaft 112 supported by the framework and having fast thereon cams 113, which engage studs or rollers 114 on the slide bars 110, the latter being provided with slots 115, only one of which is indicated by dotted lines in Fig. 21. The slide bars 110 are provided with bent fingers or arms 116, which are engaged with projections or pins 117 on the rock-shafts 105 and serve to rock the said shafts so as to move the folding arms 104 from their closed position into their open or inoperative position out of the path of movement of the side flaps 15, when the slide bars 110 are moved by their cams 113.

The slide bars 110 may be guided in their movements by rollers 118 attached to the framework (see Fig. 21). After the side flaps 14, 15, have been folded into their closed position, the carton is in the condition represented in Figs. 16 and 17, with the top and bottom flaps 16, 17, extended and in position to have adhesive material applied to the under surface of the top flaps 16 and to the upper surface of the bottom flaps 17. To this end the machine is provided with mechanism for applying the adhesive, and said mechanism may be designated the gluing mechanism, and as the gluing mechanism for the top and bottom flaps at opposite ends of the carton are alike, a detailed description of the gluing mechanism of the flaps 16, 17, at one end of the carton will suffice.

Each gluing mechanism consists of a series of small rollers 120, 121, 122, (see Fig. 3), which coöperate with the flaps 16, 17, and a sector disk 123, which acts to supply the glue to the rollers 122, 121.

The sector disk 123 is provided with two segments 125, 126 which are separated by spaces 127, and the peripheries of the segments are designed in the present instance to make contact with the roller 122 and apply glue thereto, which in turn contacts with the roller 121 and supplies it with glue. The roller 121 may be set a little higher than the roller 122 so as not to contact with the lower flap 17, to avoid too much glue being applied to the bottom flap and not enough to the top flap. The upper roller 120 contacts with the upper surface of the top flap 16 and does not contact with the roller 121 so as to leave the roller 120 free from glue to avoid the upper surface of the top flap being rendered sticky, which would be objectionable. The segments 125, 126 are separated by the spaces 127, so that the under surface of the bottom flap may be free from glue, and said sector disk is timed with relation to the travel of the carton carrier in such manner as to bring one of the spaces 127 beneath the roller 122 when the bottom flap 17 is being fed under the roller 122 with its upper surface in contact therewith.

It will thus be seen, that when the bottom flap 17 in the forward travel of the carton is moved under and in contact with the roller 122, so as to apply glue to the upper surface of said bottom flap, the sector disk has its segments 125, 126 removed from contact with the lower surface of the bottom flap 17 and consequently glue is not applied to said under surface of the bottom flap.

The sector disk 123 acts as a feed for the gluing rollers 122, 121, and in its rotation receives glue from a roller 128 (see Fig. 8), which coöperates with a roller 129 adapted to run in a bath of glue contained in a pan 130 or other suitable receptacle, which is supported by the framework. While the top and bottom flaps are having the glue applied to them, the side flaps 14, 15, are held in their closed position by the rear ends of the flap closing or folding devices 100.

Provision is made for adjusting the feed rollers 128, 129, with relation to the sector disk 123, and to this end, the roller 128 is mounted in levers 132 and the roller 129 in levers 133. The lever 132 carries an adjusting screw 134, and the lever 133 an adjusting screw rod 135 (see Fig. 8).

The sector disks 123 are mounted upon the shaft 112, which is rotated in the present instance by a link chain 136, (see Fig. 2), which is passed about a sprocket wheel 137 fast on the shaft 112 and about a sprocket wheel 138 fast on the shaft 48.

After the top and bottom flaps 16, 17, have been provided with adhesive as described, the carton carrier is moved forward a step and the bottom flaps are folded up as represented in Fig. 18 and then the top flaps are folded down as represented in Fig. 19. The upward folding of the bottom flaps is effected by stationary folders, hereinshown as plates 140, having upwardly inclined edges 141 (see Figs. 2 and 21), and the top flaps are folded down by stationary folders, hereinshown as bars 142 provided with downwardly inclined edges 143, and the latter folders have coöperating with them presser rollers 144 and beveled or scoring rollers 145, which latter serve to crease or score the upper surface of the closed carton and square the same as represented by 146 in Fig. 20.

After the cartons have been closed and sealed as described, they are fed forward into a guideway 148 (see Fig. 2) having parallel side walls 149, 150, which are separated substantially the width of the closed carton and are supported by the side bars 151, 150, which form the bottom for the guideway upon which the sealed cartons rest.

The side walls 149, 150, may be stationary and form part of the framework, but it is preferred to make one of the said walls movable toward and from the other so as to act on the sealed carton and compress or clamp the glued ends thereof to set the glue or other adhesive, so that when the cartons reach the end of the guideway 148 from which they may pass onto a suitable table, not shown, the glue will be sufficiently set to enable the cartons to be handled without danger of the flaps becoming unglued, and so that they can be immediately packed in boxes for shipment.

In the present instance, we have illustrated one arrangement for reciprocating the side wall 149, which may be termed the glue setting device.

To this end, the side wall 149 is made as an angle iron and has attached to its horizontal member ears 153 (see Figs. 4 and 5), which project beyond said member and are provided with holes through which are extended pins 154 attached to a rock-shaft 155 mounted in suitable bearings 156 attached to the framework of the machine.

The rock-shaft 155 is provided with a crank or arm 157 carrying a roller 158 (see Fig. 4), which engages a cam 159 on the face of a disk 160 fast on the main shaft 32, and is held in engagement with said cam disk by a spring 161.

It will thus be seen that at each revolution of the shaft 32, the cam 159 acts on the crank 157 to rock the shaft 155, and by means of the pins 154 and ears 153 move the side wall 149 toward the wall 150 to compress the ends of the box or carton, and this operation is performed on an individual carton a plurality of times as the latter is moved step by step through the guideway 148, with the result that when the carton emerges from the guideway the glue has been set.

It is preferred to make the glue rolls 121, 122 and pressure roll 120 adjustable as a unit with relation to the sector disks 123, which may be accomplished as herein shown (see Figs. 2, 21, and 22) by mounting the said rolls in blocks 260, which are inserted into vertical slots in uprights 261 and rest on screws 162 in the bottom wall of said slots. By turning the screws 162 so as to project more or less above the bottom of the slots in the uprights 261, the blocks 260 can be raised or lowered so as to properly adjust the glue roll 122 with relation to the sector disk 123 and when properly adjusted, the blocks may be secured in fixed relation to the uprights 161 by the set screw 164. The glue rolls 122, 121, may be positively rotated by providing their shafts with pinions 165, 166 in mesh with each other, and meshing the pinions 165 with gears 167 on the shaft 112 (see Fig. 22).

The carton carrier and the parts coöperating with it are operated by the shaft 48, which is intermittently rotated in one direction from the main shaft 32, which latter may be driven in any suitable manner and is represented as provided with a driving pulley 170.

The intermittent rotation of the shaft 48 may be effected by any suitable mechanism and in Fig. 21, we have represented one arrangement for this purpose, which consists of a ratchet disk 171 fast on the shaft 48, and provided with a plurality of teeth 172, herein shown as two in number and located substantially diametrically opposite, and with which coöperate a pawl 173 pivoted on a crank or arm 174 attached to a gear 175 loose on the shaft 48 and meshing with a rack bar 176 attached to a link or rod 177, which is connected with a crank 178 on the main shaft 32. The free end of the bar 177 is supported by the shaft 48 and is provided with a slot 180 through which the shaft 48 is extended.

By reference to Fig. 21, it will be seen that each revolution of the main shaft 32 effects a reciprocation of the rack bar 176, which rotates the gear 175 first in one direction and then in the opposite direction, and the arm 174 which moves with the gear brings the pawl 173 into engagement with a tooth of the ratchet disk 171, when the gear is moved in the direction of the arrow 181, and when the gear 175 is rotated in the direction opposite to the arrow 181, it rotates the ratchet wheel and the shaft 48 in the same direction.

It is preferred to provide the machine with means for automatically feeding the jar rings or other articles into position to be inserted into the cartons but it is not desired to limit the invention in this respect.

We have herein described the contents of the cartons as jar rings, and while the apparatus is especially adapted for putting up jar rings into individual cartons or boxes, it is evident that other articles may be handled equally as well, with a minimum labor and increased production.

We have herein shown one construction of apparatus embodying the invention, but it is not desired to limit the invention to the particular construction shown.

Claims:

1. In an apparatus of the character described, in combination, members arranged in pairs for shaping into a substantially rectangular form a substantially flat carton blank provided with end flaps, a movable carrier for said members to which one of the members is pivoted and movable toward and from a coöperating member, means for intermittently moving said carrier, means for feeding the substantially flat carton blank onto said carrier and between said members in their open position, a device movable between the layers of the substantially flat carton blank for initially separating said layers and for holding down the lower layer of the carton blank, means for closing said shaping members to convert the substantially flat blank into a substantially rectangular form, means for feeding an article into position to be inserted into said substantially rectangular carton through an open end thereof, means for inserting said article into said carton, a device movable into the opposite open end of the carton to center the article therein, means for folding the side flaps into their closed position after the said article has been inserted and centered therein, mechanism for applying adhesive material to the under surface of the top flaps and to the upper surface of the bottom flaps, means for folding said top and bottom flaps, and means for compressing the folded end flaps.

2. In an apparatus of the character described, in combination, members arranged in pairs for shaping into a substantially rectangular form a substantially flat carton blank provided with end flaps, a movable carrier for said members to which one of the members is pivoted and movable toward and from a coöperating member, means for intermittently moving said carrier, means for feeding the substantially flat carton blank onto said carrier and between said members in their open position, a device movable between the layers of the substantially flat carton blank for initially separating said layers and for holding down the lower layer of the carton blank, means for closing said shaping members to convert the substantially flat carton blank into a substantially rectangular form, means for feeding an article into position to be inserted into said substantially rectangular carton through an open end thereof, means for inserting said article into said carton, means for folding the side flaps into their closed position after the said article has been inserted therein, mechanism for applying adhesive material to the under surface of the top flaps and to the upper surface of the bottom flaps, and means for folding said top and bottom flaps.

3. In an apparatus of the character described, in combination, members arranged in pairs for shaping into a substantially rectangular form a substantially flat carton blank provided with end flaps, a movable carrier for said members to which one of the members is pivoted and movable toward and from a coöperating member, a device movable between the layers of the substantially flat carton blank for initially separating said layers and for holding down the lower layer of the carton blank while the latter is being shaped by said shaping members, means for moving said carrier, means for closing said shaping members to convert the substantially flat blank into a substantially rectangular form, means for automatically inserting an article into said substantially rectangular carton, and means for folding the end flaps to close the carton.

4. In an apparatus of the character described, in combination, members for shaping into a substantially rectangular form a substantially flat carton blank provided with end flaps, a movable carrier for said members, means for moving said carrier, means for closing said members to convert the substantially flat blank into a substantially rectangular form, and a device interposed between the layers of the substantially flat carton blank to separate the said layers and to hold a portion of the blank down while other portions thereof are being moved under the influence of said shaping members.

5. In an apparatus of the character described, in combination, means arranged in pairs for shaping into a substantially rectangular form a substantially flat carton blank provided with end flaps, an intermittently movable carrier for shaping means to which one of the members is pivoted and movable toward and from a coöpending member, means for moving said carrier intermittently, a device movable through one open end of the substantially rectangular carton for inserting the contents of the carton therein, and a device movable through the opposite open end of said carton blank to engage the contents and center the same within the carton.

6. In an apparatns of the character described, in combination, means for shaping into a substantially rectangular form a substantially flat carton blank provided with end flaps, means for inserting the contents of the carton into the latter, means for folding the side end flaps, rollers extended into the path of movement of the cartons to be engaged by the upper surface of the bottom flaps, and sector disks having segments which coöperate with said rollers to supply adhesive material thereto and are separated by spaces to avoid contact with the under surface of the bottom flaps, while the upper surfaces of the latter are engaged with the said rollers.

7. In an apparatus of the character described, in combination, mechanism for shaping, filling and sealing cartons, and a guideway coöperating therewith to receive and support the sealed cartons and provided with side walls, one of which is movable, and means for bodily moving said movable side wall intermittently toward the other side wall of said guideway to simultaneously compress a plurality of the sealed cartons as they are fed forward in said guideway and thereby cause each individual carton to be compressed a plurality of times as it is fed through the said guideway.

8. In an apparatus of the character described, in combination, a carrier for a substantially rectangular carton open at one end and provided with end flaps, a device for inserting an article into said carton, and a vertically reciprocating device to lower the bottom end flap below the path of movement of said inserting device and to arch said end flap upwardly.

9. In an apparatus of the character described, in combination, members arranged in pairs for shaping into a substantially rectangular form a substantially flat carton blank provided with end flaps, an endless carrier to which said members are secured and to which one member of said pairs is pivoted, a table over which said endless carrier travels, means at one end of the table for engaging the pivoted shaping members to turn them from their open into their closed positions, means for feeding the substantially flat carton blanks onto said carrier and between said shaping members in their open condition, means for feeding an article into position to be inserted into the carton blank between a pair of shaping members in their closed position over said table, a device for inserting said article into said carton through one open end thereof, a device inserted through the opposite open end of said carton to position the article within the carton, means for simultaneously folding corresponding side flaps at the opposite ends of the carton into their closed position after said article has been inserted and centered therein, means for applying adhesive material to the under surface of the top flaps and to the upper surface of the bottom flaps, and means for folding said top and bottom flaps.

In testimony whereof we have signed our names to this specification.

WILLIAM P. McGEOUCH.
GEORGE C. BECKWITH.